US008726631B2

(12) United States Patent
Rudrapatna et al.

(10) Patent No.: US 8,726,631 B2
(45) Date of Patent: May 20, 2014

(54) DUAL WALLED COMBUSTORS WITH IMPINGEMENT COOLED IGNITERS

(75) Inventors: Nagaraja S. Rudrapatna, Chandler, AZ (US); Paul Yankowich, Phoenix, AZ (US); Amy Hanson, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 699 days.

(21) Appl. No.: 12/623,622

(22) Filed: Nov. 23, 2009

(65) Prior Publication Data
US 2011/0120132 A1 May 26, 2011

(51) Int. Cl.
*F02C 7/264* (2006.01)
*F23R 3/60* (2006.01)

(52) U.S. Cl.
USPC .......... 60/39.821; 60/39.826; 60/796

(58) Field of Classification Search
USPC ............ 60/39.821, 39.826, 39.827, 733, 752, 60/796, 798, 799, 800, 759
See application file for complete search history.

(56) References Cited

U.S. PATENT DOCUMENTS

| | | | |
|---|---|---|---|
| 3,736,748 A | 6/1973 | Walker et al. | |
| 3,990,834 A | 11/1976 | DuBell et al. | |
| 4,954,743 A | 9/1990 | Suzuki et al. | |
| 5,682,747 A | 11/1997 | Brown et al. | |
| 5,765,833 A | 6/1998 | Able et al. | |
| 6,266,961 B1 | 7/2001 | Howell et al. | |
| 6,438,940 B1 | 8/2002 | Vacek et al. | |
| 6,557,350 B2 | 5/2003 | Farmer et al. | |
| 6,715,279 B2 | 4/2004 | White | |
| 7,013,634 B2 | 3/2006 | Pidcock et al. | |
| 7,093,441 B2 | 8/2006 | Burd et al. | |
| 7,101,173 B2 | 9/2006 | Hernandez et al. | |
| 7,216,488 B2 | 5/2007 | Howell et al. | |
| 7,299,620 B2 | 11/2007 | Stuttaford et al. | |
| 7,546,739 B2 | 6/2009 | Holland et al. | |
| 8,099,963 B2 * | 1/2012 | Pieussergues et al. | 60/800 |
| 2007/0051110 A1 | 3/2007 | Holland et al. | |
| 2007/0068166 A1 | 3/2007 | Gautier et al. | |
| 2009/0064657 A1 | 3/2009 | Zupanc et al. | |
| 2009/0178385 A1 | 7/2009 | Sandelis | |
| 2009/0199564 A1 | 8/2009 | Pieussergues et al. | |

OTHER PUBLICATIONS

Thomas J. Bronson; Dual Walled Combustors With Impingement Cooled Igniters, filed with the USPTO on Feb. 26, 2009 and U.S. Appl. No. 12/393,729.
EP Search Report, EP 10186915.4-2301 dated Feb. 18, 2011.

\* cited by examiner

*Primary Examiner* — Phutthiwat Wongwian
*Assistant Examiner* — Arun Goyal
(74) *Attorney, Agent, or Firm* — Ingrassia Fisher & Lorenz, P.C.

(57) ABSTRACT

A combustor for a gas turbine engine includes an inner liner and an outer liner circumscribing the inner liner and forming a combustion chamber therewith. The outer liner is a dual walled liner with a first wall and a second wall. A fuel igniter includes a tip portion configured to ignite an air and fuel mixture in the combustion chamber. An igniter support assembly positions the fuel igniter relative to the combustion chamber. The igniter support assembly defines a plurality of holes configured to direct cooling air toward the tip portion of the fuel igniter. The igniter support assembly includes first and second floating seals that are configured to accommodate radial and axial relative movements.

16 Claims, 3 Drawing Sheets

DUAL WALLED COMBUSTORS WITH IMPINGEMENT COOLED IGNITERS

TECHNICAL FIELD

The following description generally relates to combustors for gas turbine engines, and more particularly relates to dual walled combustors with impingement cooled igniters.

BACKGROUND

A gas turbine engine may be used to power various types of vehicles and systems. A particular type of gas turbine engine that may be used to power aircraft is a turbofan gas turbine engine. A turbofan gas turbine engine conventionally includes, for example, five major sections: a fan section, a compressor section, a combustor section, a turbine section, and an exhaust section. The fan section is typically positioned at the front, or "inlet" section of the engine, and includes a fan that induces air from the surrounding environment into the engine and accelerates a fraction of this air toward the compressor section. The remaining fraction of air induced into the fan section is accelerated into and through a bypass plenum and out the exhaust section.

The compressor section raises the pressure of the air it receives from the fan section, and the resulting compressed air then enters the combustor section, where a ring of fuel nozzles injects a steady stream of fuel into a combustion chamber formed between inner and outer liners. The fuel and air mixture is ignited to form combustion gases.

Known combustors include inner and outer liners that define an annular combustion chamber in which the fuel and air mixtures are combusted. The inner and outer liners are spaced radially inwardly from a combustor casing such that inner and outer passageways are defined between the respective inner and outer liners and the combustor casing. Fuel igniters extend through the combustor casing and the outer passageway, and are coupled to the outer liner by igniter support assemblies attached to the combustor liner. More specifically, the fuel igniter support assemblies secure and maintain the igniters in alignment relative to the combustion chamber as well as provide a sealing interface for the igniter between the outer passageway and the combustion chamber.

During operation, a portion of the airflow entering the combustor is channeled through the combustor outer passageway for attempting to cool the outer liner and igniters and diluting a main combustion zone within the combustion chamber. However, over time, continued operation may induce potentially damaging thermal stresses into the combustor that exceed the strength of materials used in fabricating the components of the combustor. For example, thermally induced transient and steady state stresses may cause low cycle fatigue (LCF) failure of the igniter.

Cooling the igniter, particularly the tip portion of the igniter closest to the combustion process, frequently presents challenges. Some conventional igniters include a plurality of longitudinal slots extending down the length of the igniter to channel cooling air to the vicinity of the tip portion of the igniter. However, this arrangement is generally not very efficient because it typically requires a relatively large amount of cooling air to sufficiently cool the tip portion of the igniter. The large amount of air used to effectively cool the tip portion of the igniter in this manner may adversely impact the combustion conditions within the combustion chamber. Particularly, a large amount of cooling air may have a perturbative effect on the ignition process, gaseous emissions, and the temperature distribution of hot gases entering the turbine. In some arrangements, the quantity and manner in which cooling air is admitted into the combustor may result in a barrier formed around the igniter that prevents fuel from reaching the tip portion of the igniter. This can additionally reduce the effectiveness of the igniter for igniting the fuel and air mixture. Moreover, excess cooling air can disrupt the liner cooling film and result in local hot spots immediately downstream of the igniter in the combustor liner.

In a dual walled combustor, the challenges involved in cooling the igniter are exacerbated. For example, the respective walls and other components may move relative to one another during operation, which should be considered by a combustor designer. Moreover, additional walls require additional sealing arrangements and more complicated paths for the cooling air to reach the igniter tip.

Accordingly, it is desirable to provide combustors with igniters that are efficiently cooled without adversely interfering with the combustion of the air and fuel mixtures in the combustion chamber. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a combustor for a gas turbine engine includes an inner liner and an outer liner circumscribing the inner liner and forming a combustion chamber with the inner liner, the outer liner being a dual walled liner with a first wall and a second wall. A fuel igniter includes a tip portion configured to ignite an air and fuel mixture in the combustion chamber. An igniter support assembly positions the fuel igniter relative to the combustion chamber. The igniter support assembly defines a plurality of holes configured to direct cooling air toward the tip portion of the fuel igniter. The igniter support assembly includes first and second floating seals that are configured to accommodate radial and axial relative movements.

In accordance with another exemplary embodiment, an igniter support assembly positions an igniter relative to a combustor having an outer dual walled liner with a hot wall and a cold wall. The igniter support assembly includes a cold boss mounted on the cold wall; a hot boss mounted on the hot wall; a first floating seal supported by the cold boss and configured to receive the igniter; and a second floating seal supported by the hot boss defining a plurality of holes configured to direct cooling air toward the igniter

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein relate to dual walled combustors. More particularly, the dual walled combustor includes an igniter support assembly that supports an igniter relative to an outer liner of a combustion chamber. The igniter support assembly has a number of holes that direct cooling impingement air onto a tip portion of the igniter. The igniter support assembly further includes first and second floating seals that accommodate relative axial and radial movement of the hot wall of the outer liner, the cold wall of the outer liner, and the outer case.

Figure 1:
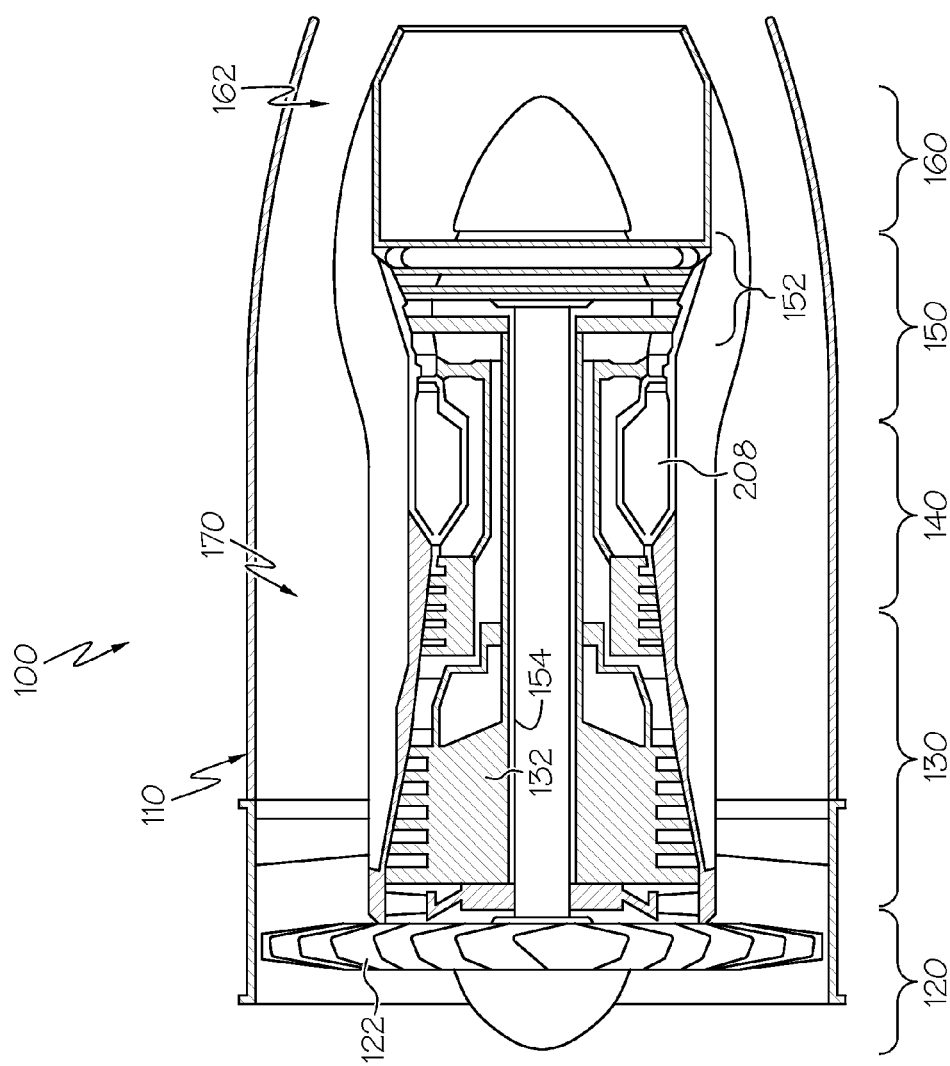
FIG. 1 is a cross-sectional view of a gas turbine engine in accordance with an exemplary embodiment.

FIG. 1 is a cross-sectional view of a gas turbine engine 100, according to an exemplary embodiment. The gas turbine engine 100 can form part of, for example, an auxiliary power unit for an aircraft or a propulsion system for an aircraft. The gas turbine engine 100 may be disposed in an engine case 110 and may include a fan section 120, a compressor section 130, a combustion section 140, a turbine section 150, and an exhaust section 160. The fan section 120 may include a fan 122, which draws in and accelerates air. A fraction of the accelerated air exhausted from the fan 122 is directed through a bypass section 170 to provide a forward thrust. The remaining fraction of air exhausted from the fan 122 is directed into the compressor section 130.

The compressor section 130 may include a series of compressors 132, which raise the pressure of the air directed into it from the fan 122. The compressors 132 may direct the compressed air into the combustion section 140. In the combustion section 140, which includes an annular combustor 208, the high pressure air is mixed with fuel and combusted. The combusted air is then directed into the turbine section 150.

The turbine section 150 may include a series of turbines 152, which may be disposed in axial flow series. The combusted air from the combustion section 140 expands through the turbines 152 and causes them to rotate. The air is then exhausted through a propulsion nozzle 162 disposed in the exhaust section 160, providing additional forward thrust. In an embodiment, the turbines 152 rotate to thereby drive equipment in the gas turbine engine 100 via concentrically disposed shafts or spools. Specifically, the turbines 152 may drive the compressor 132 via one or more rotors 154.

Figure 2:
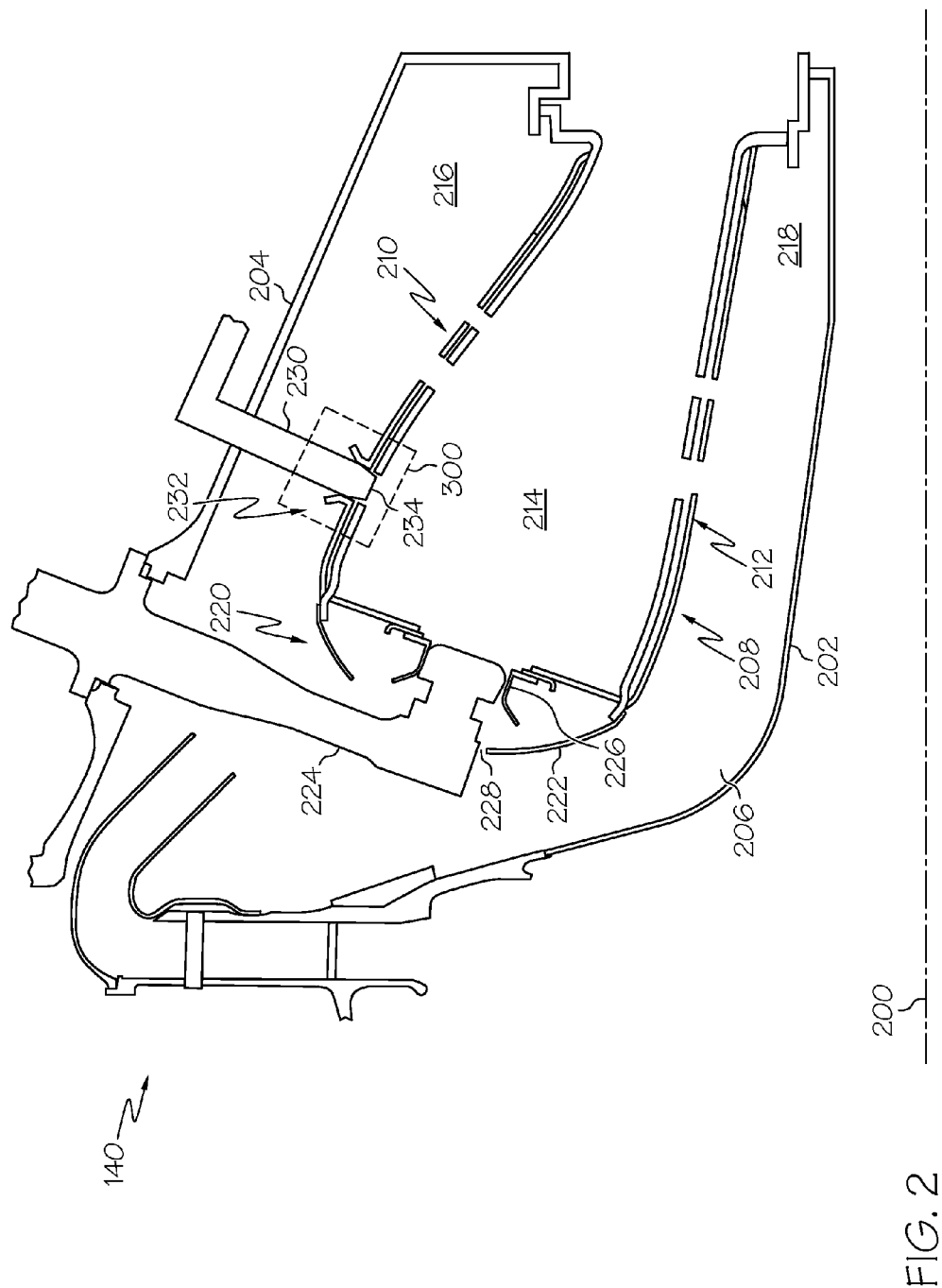
FIG. 2 is a cross-sectional view of a combustor for the gas turbine engine of FIG. 1 in accordance with an exemplary embodiment.

FIG. 2 is a more detailed cross-sectional view of the combustion section 140 of FIG. 1. In FIG. 2, only half the cross-sectional view is shown, the other half being substantially rotationally symmetric about a centerline and axis of rotation 200. Although the depicted combustion section 140 is an annular-type combustion section, any other type of combustor, such as a can combustor, can be provided.

The combustion section 140 comprises a radially inner case 202 and a radially outer case 204 concentrically arranged with respect to the inner case 202. The inner and outer cases 202, 204 circumscribe the axially extending engine centerline 200 to define an annular pressure vessel 206. As noted above, the combustion section 140 also includes the combustor 208 residing within the annular pressure vessel 206. The combustor 208 is defined by an outer liner 210 and an inner liner 212 that is circumscribed by the outer liner 210 to define an annular combustion chamber 214. The liners 210, 212 cooperate with cases 202, 204 to define respective outer and inner air plenums 216, 218.

The combustor 208 includes a front end assembly 220 comprising a shroud assembly 222, fuel injectors 224, and fuel injector guides 226. One fuel injector 224 and one fuel injector guide 226 are shown in the partial cross-sectional view of FIG. 2. In one embodiment, the combustor 208 includes a total of sixteen circumferentially distributed fuel injectors 224, but it will be appreciated that the combustor 208 could be implemented with more or less than this number of injectors 224. Each fuel injector 224 is secured to the outer case 204 and projects through a shroud port 228. Each fuel injector 224 introduces a swirling, intimately blended fuel and air mixture that supports combustion in the combustion chamber 214.

A fuel igniter 230 extends through the outer case 204 and the outer plenum 216, and is coupled to the outer liner 210. It will be appreciated that more than one igniter 230 can be provided in the combustor 208, although only one is illustrated in FIG. 2. The igniter 230 is arranged downstream from the fuel injector 224 and is positioned to ignite the fuel and air mixture within the combustion chamber 214.

The igniter 230 is coupled to the outer liner 210 by an igniter support assembly 232. More specifically, the igniter support assembly 232 is coupled within an opening 234 extending through outer liner 210, such that the igniter support assembly 232 is concentrically aligned with respect to the opening 234 of the outer liner 210. The igniter support assembly 232 maintains the alignment of the igniter 230 relative to the combustor 208. In one embodiment, the opening 234 of the outer liner 210 and the igniter support assembly 232 have substantially circular cross-sectional profiles. The igniter support assembly 232 is discussed in greater detail below.

During engine operation, airflow exits a high pressure diffuser and deswirler at a relatively high velocity and is directed into the annular pressure vessel 206 of the combustor 208. The airflow enters the combustion chamber 214 through openings in the liners 210, 212, where it is mixed with fuel from the fuel injector 224, and the airflow is combusted after being ignited by the igniter 230. The combusted air exits the combustion chamber 214 and is delivered to the turbine section 150 (FIG. 1).

Figure 3:
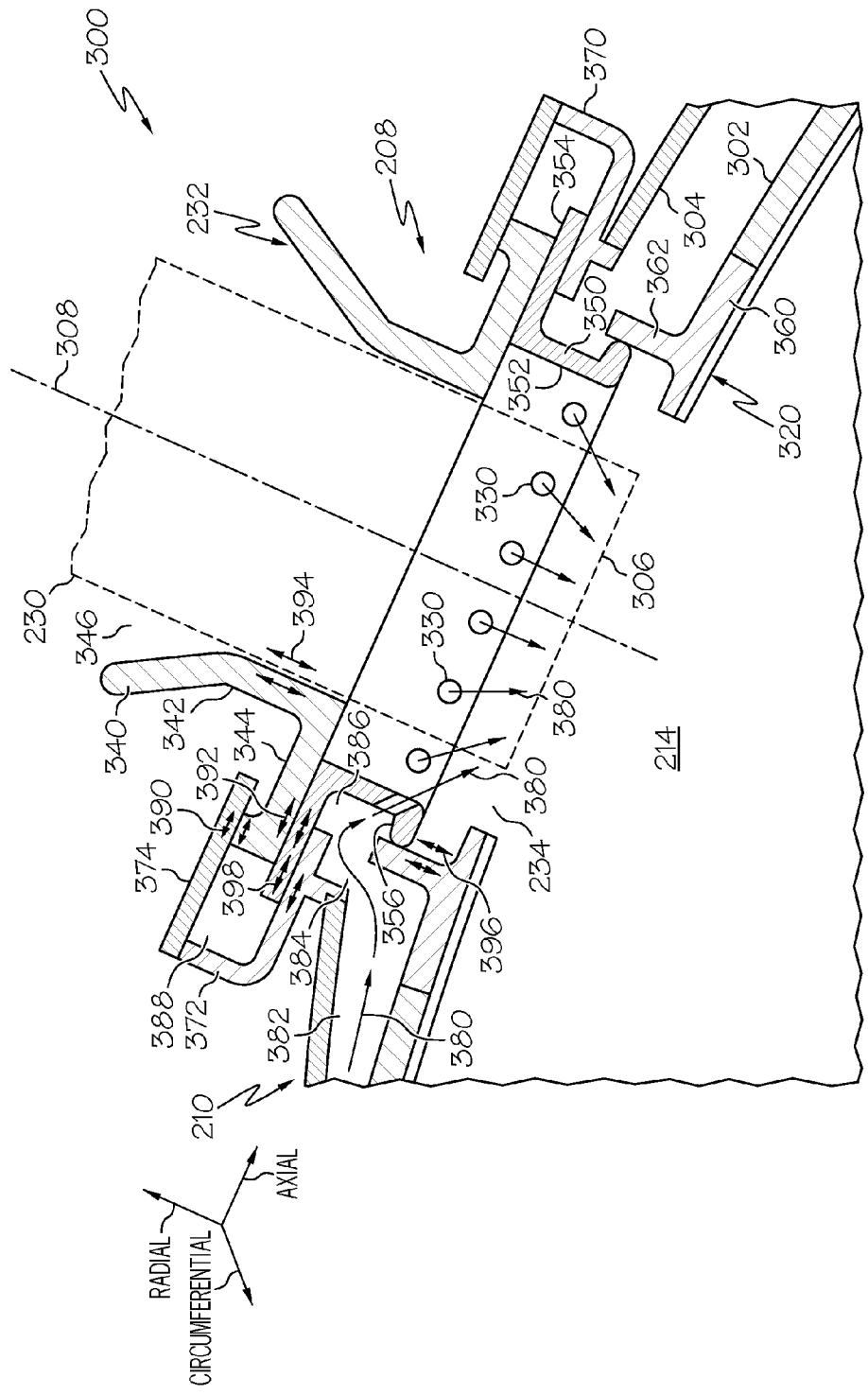
FIG. 3 is an enlarged isometric cross-sectional view of an igniter support assembly suitable for use in the combustor of FIG. 2 in accordance with an exemplary embodiment.

FIG. 3 is an enlarged isometric cross-sectional view, represented by the dashed box 300 of FIG. 2, of the igniter support assembly 232 coupled to the outer liner 210. The hot and cold walls 302, 304 may be continuous, although in further exemplary embodiments, for example, the hot wall 302 may be formed by cooling tiles or heat shields. The dual walled construction may lead to additional air available for the combustion process and a corresponding decrease in unwanted emissions. FIG. 3 additionally shows the orientation of the axial, radial, and circumferential directions, wherein circumferential direction corresponds to the a direction in and out of the page of FIG. 3.

In FIG. 3, the igniter 230 has been removed although its approximate position is indicated with dashed lines. As noted above, the igniter support assembly 232 supports the igniter 230 relative to the combustor 208, and particularly supports the igniter 230 and a tip portion 306 of the igniter 230 is exposed to the fuel and air mixture in the combustion chamber 214. The tip portion 306 may be slightly recessed, slightly protruding, or nominally flush with the inner surface of the outer liner 210.

In general, the igniter support assembly 232 forms a generally concentric ring around the igniter 230. The igniter support assembly 232 may generally have a contour that corresponds to the outer liner 210. The igniter support assembly 232 includes an igniter boss assembly 320, a first floating seal 340, and a second floating seal 350. The igniter support assembly 232 may be typically manufactured from a material similar to that outer liner 210, which is capable of withstanding the temperatures within the combustion chamber 214.

The igniter boss assembly 320 supports the igniter support assembly 232 relative to the outer liner 210. In particular, the igniter boss assembly 320 includes a hot boss 360 that supports the igniter support assembly 232 relative to the hot wall 302 of the outer liner 210 and a cold boss 370 that supports the igniter support assembly 232 relative to the cold wall 304 of the outer liner 210. In the exemplary embodiment, the hot and cold bosses 360, 370 of the igniter boss assembly 320 have substantially circular outer diameters corresponding to a diameter of the opening 234. In various embodiments, the igniter boss assembly 320 is mounted onto the respective wall 302, 304 of the outer liner 210 with adhesive, welding, screws, or any other suitable mechanism that provides an adequate sealing interface, or portions of the igniter boss assembly 320 may be integral with portions of the outer liner 210.

The hot boss 360 includes a first flange 362 that extends in a generally parallel direction to the igniter 230 and generally perpendicular to the opening 234 for retaining the second floating seal 350. The cold boss 370 includes a ring portion 372 and a cover portion 374 for retaining the first and second floating seals 340, 350 as discussed below.

The first floating seal 340 of the igniter support assembly 232 includes a tube portion 342 and a mounting portion 344 that extends substantially perpendicular from the mounting portion 344. The mounting portion 344 is received between a cavity 388 formed by the ring portion 372 and cover portions 374 of the cold boss 370. An outside diameter of the mounting portion 344 of the first floating seal 340 is less than an inside diameter of the ring portion 372. As a result of this arrangement, the first floating seal 340 may be able to move in the axial and circumferential directions (i.e., essentially freely within the axial-circumferential plane) with respect to the cold boss 370, as indicated by arrows 390 and arrows 392 and as discussed in greater detail below, while still being supported in each direction. In an alternate embodiment, the first floating seal 340 is fixed to the hot boss 360 and not movable axially relative to the hot boss 360.

The tube portion 342 of the first floating seal 340 includes a radially divergent insertion opening 346. The insertion opening 346 has a diameter at an outer end that is larger than an inside diameter. Accordingly, the first floating seal 340 can guide the igniter 230 into the igniter support assembly 232 such that the tip portion 306 of the igniter support assembly 232 extends into the combustion chamber 214. In one exemplary embodiment, the first floating seal 340 enables radial movement of the igniter 230 relative to the first floating seal 340, as indicated by arrows 394 and as discussed in greater detail below.

The second floating seal 350 has a main body 352 that extends generally parallel to the longitudinal axis of the igniter 230 and a retention flange 354. The main body 352 is retained in an axial direction by the hot boss 360 and in a radial direction between the cold boss 370 and the first floating seal 340. The second floating seal 350 additionally includes a lip 356 to maintain a separation between the main body 352 and the hot boss 360. As a result of this arrangement, in one exemplary embodiment, the second floating seal 350 may have a degree of radial movement relative to the hot boss 360, as indicated by arrows 396, a degree of axial and circumferential movements relative to the cold boss 370, as indicated by arrows 398, and a degree of axial and circumferential movements relative to the first floating seal 340, as indicated by arrows 392. The interface between the hot boss 360 and the second floating seal 350 at lip 356 may also allow a controlled leakage of cooling air between a liner cavity 382 and the combustion chamber 214. This controlled leakage may also be eliminated. The relative movements are discussed in greater detail below.

As noted above, the igniter support assembly 232 defines a number of cooling holes 330 for directing air to the igniter 230. The cooling holes 330 may be circular in diameter and equally spaced about the igniter 230, although other arrangements and shapes are possible. The cooling holes 330 may be non-circular and at any suitable angle, such as perpendicular or tangential such that a cooling vortex is established. In particular, the second floating seal 350 defines cooling holes 330. During operation, air from the plenum 216 (FIG. 2) flows as cooling flow 380 into a liner cavity 382 between hot wall 302 and the cold wall 304, through a gap 384 between the hot boss 360 and cold boss 370, and into a tube cavity 386. The cooling flow 380 passes from the tube cavity 386, through the cooling holes 330, and typically directly impinges the igniter 230. The lip 356 on the second floating seal 350 maintains the fluid communication between the tube cavity 386 and the cooling holes 330 even upon radial movement between the second floating seal 350 and the hot boss 360. Similarly, the cold boss 370 is mounted on the cold wall 304 such that a portion of the ring portion 372 maintains a separation between cold boss 370 and second floating seal 350 during axial and circumferential movements, which as a result, maintains fluid communication between the tube cavity 386 and cooling holes 330.

The cooling flow 380 through the cooling holes 330 maintains the temperature of the igniter support assembly 232 to a desired level. The flows 380 can particularly be directed to, and cool, the tip portion 306 of the igniter 230. In the illustrated embodiment, the flows 380 are angled in a radial direction to impinge on the igniter 230 by the orientation of the cooling holes 330, although in other embodiments, the flows 380 may be in essentially perpendicular or any suitable angle to the longitudinal axis 308 of the igniter 230.

During operation, different portions of the combustor section 140 (FIG. 2) may be subject to different temperatures and stresses. As such, the different portions of the combustor section 140 may have different relative movements. For example, the outer case 204, the hot wall 302 of the outer liner 210, and the cold wall 304 of the outer liner 210 may expand or contract at different rates or times relative to one another. Collectively, the igniter 230 and igniter support assembly 232 are coupled to each of these components, and as such, the igniter support assembly 232 may accommodate some or all of the relative movements.

As discussed above, the igniter support assembly 232 has several features that enable some degree of relative movement. For example, the igniter 230 is not fixed with respect to the first floating seal 340 such that the igniter 230 is movable relative to the first floating seal 340 in a generally radial direction, as indicated by arrows 394. This accommodates relative movement in a radial direction between the outer case 204 (FIG. 2) and the cold wall 304 of the outer liner 210. The first floating seal 340 is also movable relative to the cold boss 370 and second floating seal 350 in generally axial and circumferential directions, as indicated by the arrows 390 and arrows 392. This accommodates relative movement in axial and circumferential directions between the outer case 204 (FIG. 2) and the cold wall 304 of the outer liner 210. The second floating seal 350 is movable relative to the cold boss 370 in a generally axial direction, as indicated by arrows 398. This accommodates relative movement in axial and circumferential directions between the hot wall 302 and the cold wall 304 of the outer liner 210. The second floating seal 350 is also movable relative to the hot boss 360 in a generally radial direction, as indicated by arrows 396. This accommodates relative movement in a radial direction between the hot wall 302 and the cold wall 304. Accordingly, the exemplary combination of the cooling holes 330 and igniter support assembly 232 provide impingement cooling within a dual wall combustor 208, which as discussed above, includes consideration of relative movement of components, additional sealing requirements, and achieving impingement at a greater igniter tip depth, particularly when compared to a single wall combustor.

As noted above, although the illustrated embodiment illustrates the hot boss 360, the cold boss 370, the first floating seal 340, and the second floating seal 350 as separate pieces, and in an alternate embodiment, one or more of these components may be integral with one another. Some igniters 230 may have jackets (not shown) completely or partially covering the tip portion 306 of the igniter 230. In these arrangements, the jacket can be at least partially removed to allow access of the cooling air to the tip portion 306 of the igniter 230.

In an exemplary embodiment, the flows 380 through the igniter support assembly 232 can cool the tip portion 306 of the igniter 230 to temperatures less than, for example, 1500° F. In another exemplary embodiment, the flows 380 through the igniter support assembly 232 can cool the tip portion 306 of the igniter 230 to temperatures of, for example, 1200° F. Exemplary arrangements enable placement of the tip portion 306 within or proximate to the combustion chamber 214, which has particularly been a difficult issue in conventional dual wall combustors.

Impingement cooling is more effective than conventional mechanisms, such as slot cooling, for cooling the igniter, and therefore, a reduced amount of air can be used to effectively cool the igniter 230. In one exemplary embodiment, the amount of air necessary to cool the igniter 230 in the combustor 208 is one third or one fourth of the amount of air necessary to cool igniters in conventional combustors. By reducing the amount of necessary flows 380 through the igniter support assembly 232, the function of the igniter 230 and/or the combustion conditions in the combustion chamber 214 are not adversely affected. Different configurations and arrangements of the igniter support assembly 232 can be provided as necessary in dependence on the desired temperature of the igniter 230 and the sensitivity of the combustor 208 to additional cooling air. Reduced temperatures in the igniter 230 result in lower thermal stresses and improved life in a cost-effective and reliable manner. In some embodiments, the igniter support assembly 232 may provide satisfactory cooling with reduced weight, parts count and cost as compared with conventional arrangements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a gas turbine engine, comprising:
    an inner liner;
    an outer liner circumscribing the inner liner and forming a combustion chamber with the inner liner, the outer liner being a dual walled liner with a first wall and a second wall, the first and second walls defining a liner cavity;
    a fuel igniter comprising a tip portion configured to ignite an air and fuel mixture in the combustion chamber; and
    an igniter support assembly positioning the fuel igniter relative to the combustionchamber, the igniter support assembly defining a plurality of holes configured to direct cooling air toward the tip portion of the fuel igniter, the igniter support assembly comprising first and second floating seals that are configured to accommodate radial and axial relative movements,
    wherein the igniter support assembly further comprises a first boss configured to couple the igniter support assembly on the first wall and a second boss configured to couple the igniter support assembly on the second wall, the second boss attached to the second wall,
    wherein the second floating seal is retained by the first boss in a radial direction and is movable relative to the first boss in an axial direction,
    wherein the second floating seal is retained in the axial direction by the second boss and is movable relative to the second boss in the radial direction,
    wherein the first and second walls are continuous annular walls; and
    wherein the second boss includes a protrusion extending into the liner cavity to at least partially define a gap between the first boss and the second boss.

2. The combustor of claim 1, wherein the first floating seal is retained by the first boss in a radial direction and is movable relative to the first boss in an axial direction, and wherein the igniter is movable relative to the first floating seal in the radial direction.

3. The combustor of claim 1, wherein the outer liner and igniter support assembly are configured such that the cooling air flows from the liner cavity and through the plurality of holes to the tip portion of the fuel igniter, wherein the liner cavity is sealed at a forward end and at an aft end to formed a continuous seal cavity about an engine axis.

4. The combustor of claim 3, wherein the first floating seal and the second floating seal define a seal cavity, and wherein the outer liner and igniter support assembly are configured such that the cooling air flows from the liner cavity, through the gap, through the seal cavity, and through the plurality of holes to the tip portion of the fuel igniter.

5. The combustor of claim 4, wherein the second floating seal defines the plurality of holes, and wherein the plurality of holes is arranged such that the cooling air impinges on the tip portion of the fuel igniter at a radial end.

6. The combustor of claim 1, wherein the plurality of holes is configured such that the cooling air directly impinges the tip portion.

7. The combustor of claim 1, wherein the first boss comprises diverging portions for guiding the fuel igniter into the igniter support assembly.

8. The combustor of claim 1, wherein the first boss includes a ring portion and a cover portion defining a first boss cavity, and wherein the first floating seal and the second floating seal are retained by the ring portion and the cover portion within the first boss cavity in the radial direction to enable movement of the first floating seal and the second floating seal in the axial direction.

9. The combustor of claim 1, wherein the igniter support includes a tube portion that forms the first floating seal and further includes a main body that forms the second floating seal, the first floating seal being axially movable relative to the second floating seal.

10. The combustor of claim 1, wherein the first wall and the second wall are positioned to have different rates of contraction and expansion during operation.

11. The combustor of claim 1, wherein the first boss engages the second floating seal to prevent movement in the radial direction toward the combustion chamber between the second floating seal and the first boss.

12. The combustor of claim 11, wherein the second floating seal has an annular flange with a first radial surface facing away from the combustion chamber and a second radial surface, opposite the first radial surface, facing toward the combustion chamber, and wherein the first boss engages the second radial surface of the second floating seal.

13. The combustor of claim 1, wherein the second floating seal has a main body that extends generally parallel to the igniter, a retention flange extending from the main body and engaging the first boss, and a lip extending from the main body and engaging the second boss.

14. The combustor of claim 13, wherein the lip extends from the main body in the axial direction such that an axial distance of separation is maintained between the main body and the second boss.

15. The combustor of claim 14, wherein the lip has a rounded edge.

16. A combustor for a gas turbine engine, comprising:
an inner liner;
an outer liner circumscribing the inner liner and forming a combustion chamber with the inner liner, the outer liner being a dual walled liner with a hot wall and a cold wall, the hot and cold walls being continuous annular walls;
a fuel igniter comprising a tip portion configured to ignite an air and fuel mixture in the combustion chamber; and
an igniter support assembly positioning the fuel igniter relative to the combustion chamber, the igniter support assembly comprising
a cold boss mounted on the cold wall; a hot boss mounted on the hot wall; a first floating seal supported by the cold boss and configured to receive the igniter; and a second floating seal supported by the hot boss,
wherein the first floating seal is retained by the cold boss in a radial direction and is movable relative to the cold boss in an axial direction, the igniter being movable relative to the first floating seal in the radial direction, the second floating seal is retained by the cold boss in a radial direction and movable relative to the cold boss in an axial direction, the second floating seal being retained in the axial direction by the hot boss and movable relative to the hot boss in the radial direction the second floating seal defining a plurality of holes configured to direct cooling air toward the fuel igniter, and
wherein the first and second walls of the outer liner form a liner cavity, wherein the hot boss includes a protrusion extending into the liner cavity to at least partially define a gap between the hot boss and the cold boss, and the first floating seal and the second floating seal define a seal cavity, and wherein the outer liner and igniter support assembly are configured such that the cooling air flows from the liner cavity, through the gap, through the seal cavity, and through the plurality of holes to directly impinge the tip portion of the fuel igniter.

* * * * *